United States Patent [19]

Bousquet et al.

[11] Patent Number: 5,725,781
[45] Date of Patent: Mar. 10, 1998

[54] METHOD AND CATALYST FOR FORCED CATALYTIC DEOXYGENATION OF SEA WATER

[75] Inventors: Jacques Bousquet, Irigny; Jacques Barbier, Montanise; Jean-Luc Volle, Muret, all of France

[73] Assignee: Elf Aquitaine Production, France

[21] Appl. No.: 553,474

[22] PCT Filed: Mar. 10, 1995

[86] PCT No.: PCT/FR95/00276

§ 371 Date: Jan. 11, 1996

§ 102(e) Date: Jan. 11, 1996

[87] PCT Pub. No.: WO95/24360

PCT Pub. Date: Sep. 14, 1995

[30] Foreign Application Priority Data

Mar. 11, 1994 [FR] France ..................... 94 02832

[51] Int. Cl.$^6$ ..................................................... C02F 1/70
[52] U.S. Cl. ................................................ 210/757; 210/763
[58] Field of Search .......................... 210/758, 759, 210/763, 757, 762; 502/185, 325, 326, 339

[56] References Cited

U.S. PATENT DOCUMENTS

| | | | |
|---|---|---|---|
| 2,285,277 | 6/1942 | Henke et al. | 502/185 |
| 3,138,560 | 6/1964 | Keith et al. | 502/185 |
| 4,028,274 | 6/1977 | Kunz | 502/185 |
| 4,031,137 | 6/1977 | Schmitt, Jr. et al. | 502/185 |
| 4,035,260 | 7/1977 | Schmitt, Jr. | 502/185 |
| 4,082,699 | 4/1978 | Petrow et al. | 502/185 |
| 4,111,842 | 9/1978 | van Myntfort et al. | 502/185 |
| 4,136,059 | 1/1979 | Jalan et al. | 502/185 |
| 4,145,314 | 3/1979 | Fung et al. | 502/185 |
| 4,158,643 | 6/1979 | Sinha | 502/185 |
| 4,367,167 | 1/1983 | Lee et al. | 502/339 |
| 4,447,665 | 5/1984 | Wennerberg | 502/185 |
| 4,454,246 | 6/1984 | Fung | 502/185 |
| 4,482,641 | 11/1984 | Wennerberg | 502/185 |
| 4,518,488 | 5/1985 | Wennerberg | 502/185 |
| 4,522,931 | 6/1985 | Gubitosa et al. | 502/150 |
| 4,527,626 | 7/1985 | Cantu et al. | 166/275 |
| 4,530,820 | 7/1985 | Henriksen | 423/219 |
| 4,656,153 | 4/1987 | Wennerberg | 502/185 |
| 5,447,896 | 9/1995 | Rao | 502/185 |

FOREIGN PATENT DOCUMENTS

| | | |
|---|---|---|
| 0106729 | 4/1984 | European Pat. Off. . |
| 0316569 | 5/1989 | European Pat. Off. . |

Primary Examiner—Cynthia L. Nessler
Attorney, Agent, or Firm—Weiser & Associates, P.C.

[57] ABSTRACT

Sea water previously filtered and temperature controlled, and which includes added hydrogen is continuously pumped at a constant rate to a deoxygenation reactor containing a divided platinum catalyst on a granular activated carbon support. The deoxygenated sea water is continuously discharged from the reactor through a line. The divided platinum of the catalyst is present in a superficial layer of the support grains and the platinum dispersion in the catalyst grains is at least 10%.

12 Claims, 1 Drawing Sheet

METHOD AND CATALYST FOR FORCED CATALYTIC DEOXYGENATION OF SEA WATER

FIELD OF THE INVENTION

The invention relates to a process for exhaustive catalytic deoxygenation of water of various origins and most particularly of seawater. It also relates to the catalyst employed for making use of the said process and also deals with the preparation of this catalyst.

The maintenance of oil deposits, especially offshore deposits, at pressure and/or the improved recovery of the oil oblige the producers of offshore oil to inject seawater into the deposit being exploited. Such a process makes it necessary for this water to be treated before injection into the deposit. This is why a bactericidal chlorination treatment is generally carried out first of all, followed by a multistage filtration so as to remove any suspended matter that could give rise to possible blockages in the device for injecting this seawater and also in the deposit and in the production wells. Finally, exhaustive deoxygenation of the seawater must be carried out after filtration, otherwise it is to be feared that very considerable risk of corrosion of the plant will arise, with financial consequences that can be imagined.

To bring about of the abovementioned deoxygenation of seawater, the techniques conventionally employed are stripping using oxygen-free gases or the application of partial vacuum. These two techniques are today proven and effective because they make it easily possible to achieve a residual oxygen content in the treated seawater which is of the order of 50 ppb (1 ppb=$1\times10^{-7}$% by weight).

These techniques also have some intrinsic disadvantages. It is known, for example, that gas stripping always acidifies the water a little because of the $CO_2$ which is always present. In addition, the traces of oil which are entrained in the stripping gas, despite the most efficient demisting techniques, may present problems of blocking throughout the production plants. The use of vacuum degassing towers does not present any difficulties of this kind but, on the other hand, has the disadvantage of using rotary machines which must be reliably maintained and the operation of which requires the installation of structures which are particularly costly at sea.

It is known that the oxygen present in low concentration in fresh water can be removed by in-situ reaction with hydrogen, predissolved in the water to be treated, carried out in contact with a solid catalyst based on palladium or platinum, dispersed on a granular solid support. Thus, reference U.S. Pat. No. 4,789,488 describes a process of this type for the deoxygenation of boiler waters which contain of the order of 8 ppm of oxygen in the dissolved state, by employing a catalyst based on finely divided palladium or platinum on a support consisting of a polystyrene anion-exchanger resin and by operating at temperatures of between approximately 15° C. and 40° C.

Reference U.S. Pat. No. 3,052,527 relates to the removal of the oxygen present in water by passing a stream of the water to be treated through a bed of an activated absorbent consisting of palladium or platinum deposited on activated carbon, which absorbent contains hydrogen that is chemisorbed by keeping the said adsorbent in a hydrogen atmosphere between two passes of the water to be treated in contact with the bed of activated adsorbent.

Reference EP-A-0 316 569 proposes a process for the removal of the oxygen present in water, especially drinking water, by catalytic hydrogenation in the presence of a catalyst consisting especially of palladium and/or of platinum on a support formed by, for example, activated carbon. In this process the water to be treated is sprayed onto a bed of the said catalyst placed in a reaction zone filled with hydrogen, the water is allowed to flow or trickle through the catalyst bed and the treated water is then removed out of the said zone. The process is used at temperatures ranging from 0° C. to 100° C. and especially at temperatures close to the ambient and at hydrogen pressures ranging from 1 to 10 bars and in particular from the ambient pressure to 5 bars. The overall weight content of palladium and/or platinum in the catalyst may range from 0.01% to 10% and preferably from 0.1% to 5% and the BET specific surface of the said catalyst may assume values of from 0.1 $m^2/g$ to 2 000 $m^2/g$. The residence time of the water to be deoxygenated in contact with the catalyst bed may represent 0.1 to 10 minutes and preferably from 0.2 to 2 minutes.

A technique for the removal of the oxygen present in seawater by catalytic hydrogenation in contact with a solid catalyst would be of considerable interest when compared with the techniques of stripping or of application of partial vacuum, because it would offer many advantages, especially great compactness of the plant, absence of any rotating components, and no problem of foaming in the columns or of blocking in the wells. Moreover, since the quantity of hydrogen needed for the reaction is very small, being determined stoichiometrically in relation to the oxygen content to be reduced, the supply of hydrogen would not present any particular problem.

However, if attempts are made to adapt to the deoxygenation of seawater the abovementioned techniques of deoxygenation of fresh water by catalytic hydrogenation in contact with a catalyst based on palladium and/or platinum used in combination with a granular support such as activated carbon, the results obtained are far from being satisfactory. In fact, whatever the nature of the support, palladium-based catalysts are not stable in contact with seawater and their deoxygenation activity drops after fairly short periods of time on the scale of an industrial application. Platinum-based catalysts on activated carbon support, which are available commercially, are stable in contact with seawater. However, the deoxygenation activity of these catalysts is generally insufficient to achieve an exhaustive deoxygenation corresponding to residual oxygen contents in the treated seawater which are lower than 50 ppb.

SUMMARY OF THE INVENTION

It has now been found that it is possible to carry out an exhaustive deoxygenation of seawater, that is to say removal of the dissolved oxygen down to contents lower than 50 ppb and especially down to contents of the order of 10 ppb to 20 ppb, by catalytic hydrogenation in the presence of a platinum-based catalyst on a granular activated carbon support, with excellent stability of the deoxygenation yield with time, when the platinum is present, in particular conditions of dispersion, in a surface layer of the activated carbon granules.

DETAILED DESCRIPTION OF THE INVENTION

Figure 1:
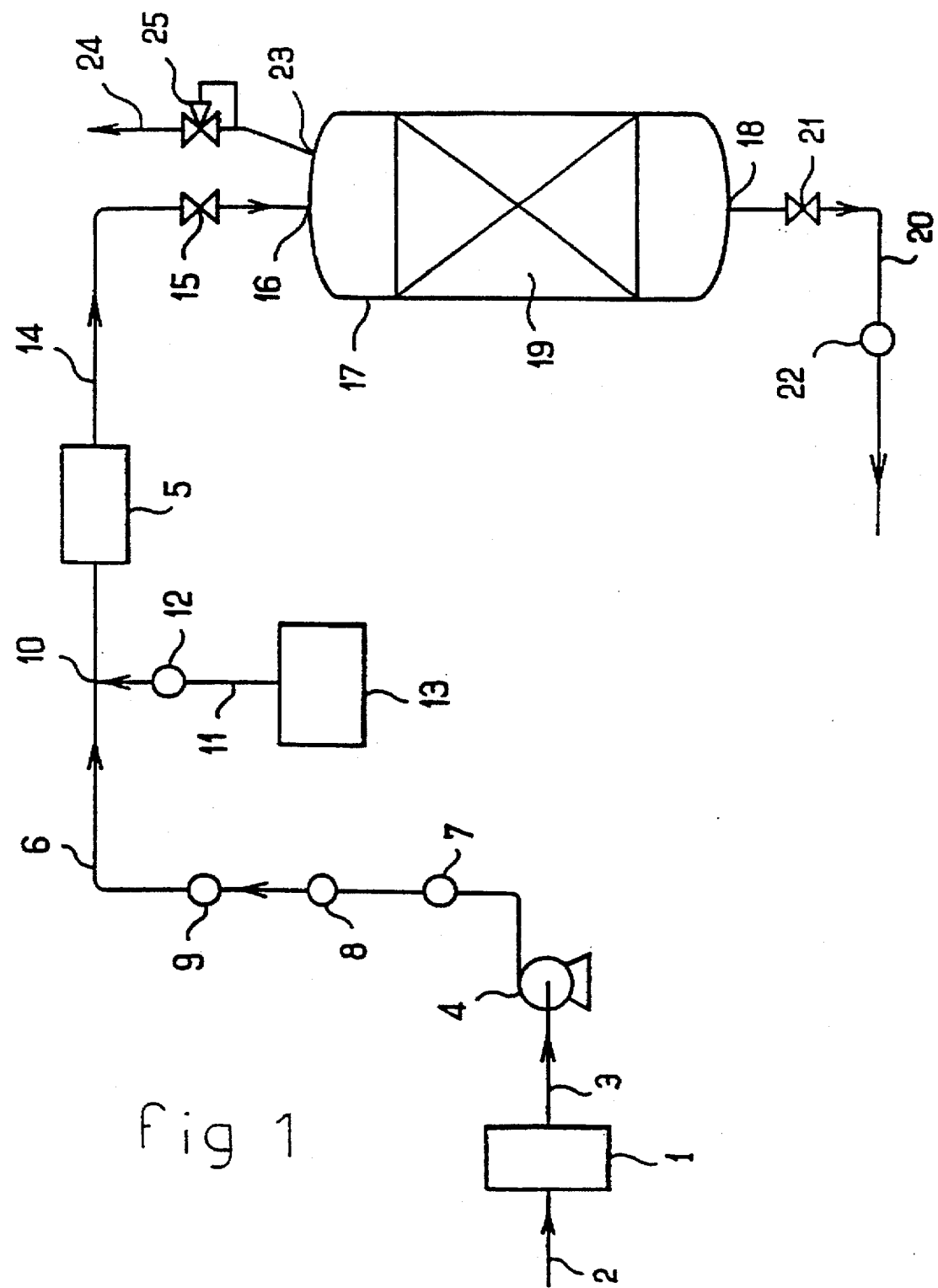
FIG. 1 shows a diagrammatic view of a plant for deoxygenation of water.

The subject of the invention is therefore a process for exhaustive catalytic deoxygenation of water of various origins and most particularly of seawater, in which the water to be treated is passed in the presence of hydrogen in contact with a catalyst consisting of divided platinum used in combination with a granular activated carbon support, the said process being characterized in that the divided platinum of the catalyst is present in a surface layer of the activated carbon support particles and in that the dispersion of the platinum in the catalyst particles, defined as being the ratio of the number of atoms of platinum at the surface of the particles to the total number of platinum atoms present in the said particles, is at least 10%.

The number of platinum atoms NA at the surface of the catalyst particles is determined by chemisorption of oxygen and titration of the oxygen chemisorbed with hydrogen.

The total number NT of platinum atoms in the catalyst is determined from the quantity of platinum present in the said catalyst.

The determination of the number of platinum atoms NA at the surface of the catalyst particles relies on pulse chromatography and comprises the purging of a sample of catalyst with the aid of a carrier gas consisting, for example, of argon, into which pulses of oxygen (oxygen chemisorption) or pulses of hydrogen (titration) are injected. The gas flow collected after purging of the catalyst is passed through a chromatography column filled with 5A molecular sieve and equipped with a detector of the katharometer type for the purpose of quantitative analysis of the constituents of the said gas flow.

The determination of the number of platinum atoms NA comprises the following three stages:

Conditioning of the catalyst: A measured quantity, for example 300 mg, of a sample of catalyst is degassed under argon and then reduced under hydrogen and finally degassed under argon, each of these three stages being carried out at 500° C. for 2 hours.

Chemisorption of oxygen: The chemisorption of oxygen obeys the equation $Z_A + \frac{1}{2}O_2 \rightarrow Z_A O$, where $Z_A$ denotes a platinum atom at the surface of the catalyst. This chemisorption of oxygen is carried out at ambient temperature by purging the sample of catalyst, conditioned as indicated above, with a stream of carrier gas (argon) travelling at a constant given flow rate, for example 30 ml/minute, into which pulses of oxygen are injected until the $Z_A$ atoms are saturated.

Titration of the chemisorbed oxygen with hydrogen: After a purge of the catalyst containing the oxygen chemisorbed (TO) by the $Z_A$ atoms, by purging with the carrier gas alone for a measured period, for example 10 minutes, the chemisorbed oxygen (OT) is titrated with the hydrogen (HT) at ambient temperature, the said hydrogen being delivered in the form of pulses into the purging carrier gas.

The catalyst undergoes a number of oxygen and hydrogen chemisorption cycles.

The chemisorbed quantities of oxygen (OT) and of hydrogen (HT) are linked by the relationship (HT):(OT)=2 and the number of platinum atoms NA is given by NA=⅓(HT)=⅔(OT). The dispersion D (%) of the platinum in the catalyst is given by the relationship D(%)=NA/NT×100.

As indicated above, according to the invention, the dispersion of the platinum in the deoxygenation catalyst is at least 10%. It lies more particularly between 10% and 95% and preferably between 12% and 65%.

The total quantity of platinum present in the catalyst my be between 0.05% and 5% and more especially between 0.1% and 3% by weight of the catalyst. The said total quantity of platinum is preferably between 0.1% and 1.5% by weight of the catalyst.

The granular activated carbon support used in combination with the platinum to form the catalyst employed in the process according to the invention has a specific surface, determined by application of the BET nitrogen adsorption method, which may be between 10 $m^2/g$ and 2000 $m^2/g$ and lies more particularly between 50 $m^2/g$ and 1800 $m^2/g$.

To make use of the process according to the invention for catalytic deoxygenation of water of various origins and most particularly of seawater, a quantity of hydrogen which is at least equal to the stoichiometric quantity necessary for consuming the oxygen dissolved in the water to be deoxygenated is first of all dissolved in this water and then the water to which hydrogen has been added is brought into contact with the catalyst based on platinum on activated carbon for a sufficient period to perform the reaction $2H_2 + O_2 \rightarrow 2H_2O$ in contact with the said catalyst and the treated water is removed after it has been brought into contact with the catalyst, the said operations being carried out continuously.

The water to be treated is advantageously subjected to a filtration stage before the hydrogen needed for the deoxygenation is added to it.

The process according to the invention may be used at temperatures of between 0° C. and 60° C. and more particularly between 5° C. and 45° C., the preferred temperatures corresponding to the ambient temperature of the water to be treated or being close to the latter.

Absolute pressures of between 1 and 10 bars and more particularly ranging from 1.5 to 4 bars may be maintained upstream of the zone where the deoxygenation catalyst is brought into contact with the water to which hydrogen has been added.

The flow rate of the water to be deoxygenated to which hydrogen has been added, which is brought into contact with the catalyst based on platinum on activated carbon, is advantageously between 2 l and 100 l per hour per liter of catalyst and preferably lies between 5 l and 70 l per hour per liter of catalyst.

The maximum quantity of oxygen present in the water to be deoxygenated varies as a function of the temperature of the water to be treated and especially of the pressure to which it is subjected. Thus, in the case of seawater, at a temperature of 10° C., the said water may have an oxygen content ranging up to approximately 11 ppm at atmospheric pressure and up to approximately 115 ppm at a pressure of 10 bars absolute.

The quantity of hydrogen to be dissolved in the water to be deoxygenated represents at least the stoichiometric quantity necessary for consuming all of the oxygen present in this water, that is to say for carrying out the reaction $2H_2 + O_2 \rightarrow 2H_2O$. The quantity of hydrogen to be dissolved in the water with a view to the reaction with the oxygen in contact with the catalyst is preferably between 1 and 2 times and preferably between 1 and 1.5 times the said stoichiometric quantity. The dissolving of the appropriate quantity of hydrogen in the water to be deoxygenated is done by bringing the said water into contact with a stream of hydrogen at a pressure that correspond to the required dissolving, a pressure which is calculated by application of the laws of thermodynamics.

The process according to the invention for the deoxygenation of water of various origins is of very particular value for the deoxygenation of seawater in the conditions of exploitation which are commonly met in oil production, especially offshore production, where the robustness and reliability of plant are essential factors when choosing the techniques to be used, especially with the prospect of possible unmanned platforms at sea.

The catalyst based on divided platinum on a granular activated carbon support, which is employed in the process according to the invention for deoxygenation of water of various origins and most particularly of seawater, may be obtained by making use of any method allowing divided platinum to be formed in a surface layer of each particle of support and allowing a dispersion D of the divided platinum to be obtained in the catalyst particles which is at least 10% and advantageously between 10% and 95% and preferably between 12% and 65%.

In particular, the said catalyst may be obtained by applying the following stages:

pretreating a granular activated carbon support which has a nitrogen adsorption BET specific surface of between 10 m$^2$/g and 2000 m$^2$/g and more particularly between 50 m$^2$/g and 1800 m$^2$/g, with an oxidizing agent in aqueous phase, if need be washing the treated support with water to remove the residual oxidizing agent, and then drying and calcining the treated support in air, the said calcining being carried out at a temperature lower than 500° C., bringing an aqueous suspension of the calcined pretreated support, with stirring, into contact with a solution, especially an aqueous one, of a basic platinum salt, the operation being carried out in a pH region higher than 8, preferably between 8.5 and 12.5, and then separating the catalyst from the aqueous phase, washing and drying the said catalyst and next calcining this catalyst at temperatures lower than 500° C., and reducing the catalyst with hydrogen, the operation being carried out at temperatures of between 350° C. and 650° C., preferably between 450° C. and 600° C., to form divided platinum on the activated carbon support.

The oxidizing agent advantageously consists of 1N to 5N nitric acid. In this case the pretreatment of the granular activated carbon support is preferably carried out by heating the suspension of the support in nitric acid to reflux.

The invention is illustrated by the following examples which are given without any limitation being implied.

EXAMPLES 1 TO 7

Tests of deoxygenation of seawater were carried out employing a plant similar to that shown diagrammatically in the figure of the attached drawing.

This plant comprised a filter (1) provided with an entry conduit (2) for the seawater and an exit conduit (3) connected to the suction of a pump (4). The delivery of this pump was connected to the entry of a static mixer (5) via a conduit (6) in which there were fitted a temperature regulator (7), a flow-rate regulator (8), an oxygen probe (9) and a branch fitting (10) extended by a pipe (11) provided with a flow-rate regulator (12) and connecting the conduit (3) to a source of hydrogen (13). The exit of the static mixer was connected, via a conduit (14) in which a valve (15) was fitted, to the entry (16) of a deoxygenation reactor (17) comprising an exit (18), its entry (16) and exit (18) being separated by a fixed bed of a deoxygenation catalyst (19). The exit (18) of the reactor (17) was extended by a conduit (20) for removal of the treated seawater, the said conduit being provided with a valve (21) and, downstream, with an oxygen probe (22). The deoxygenation reactor (17) also comprised, at the head, an exit (23) extended by a pipe (24) in which a pressure-regulating valve (25) was fitted.

The seawater to be deoxygenated, arriving continuously via the conduit (2) filtered in the filter (1), was delivered by the pump (4) to the static mixer (5) with a temperature controlled by the temperature regulator (7) and a flow rate kept constant by the flow-rate regulator (8) and having received, via the branch fitting (10), a flow of hydrogen provided by the source of hydrogen (13) and controlled by the flow-rate regulator (12). After passing through the static mixer, which promotes the dissolution of hydrogen in the seawater, the stream of seawater to be deoxygenated, now containing the appropriate quantity of dissolved hydrogen, was brought to the reactor (17) in which the oxygen and hydrogen present in the seawater react in contact with the deoxygenation catalyst (19) to form water according to the reaction $2H_2+O_2 \rightarrow 2H_2O$. The treated seawater was removed continuously from the reactor (17) via the conduit (20). The oxygen probe (9) continuously determines the quantity of oxygen in the seawater to be deoxygenated and the oxygen probe (22) enables the residual content in the treated seawater to be measured continuously.

Examples 1 to 4 are examples carried out according to the invention, whereas Examples 5 to 7 are control examples.

The catalysts employed in the various examples were the following:

Examples 1 to 4 (according to the invention): catalysts containing 1% by weight of divided platinum deposited in a surface layer of the granules of a granular activated carbon support which has a nitrogen adsorption BET specific surface equal to 1200 m$^2$/g (Example 1), 1560 m$^2$/g (Examples 2 and 3) and 1200 m$^2$/g (Example 4), the dispersion D of the platinum in the case of these catalysts having the values 14% (Example 1), 25% (Example 2), 30% (Example 3) and 53% (Example 4).

Example 5 (control): commercial catalyst containing 1% by weight of platinum deposited from a conventional impregnation of an activated carbon support with a platinum salt, the support having a nitrogen adsorption BET surface equal to 1200 m$^2$/g, the dispersion D of the platinum in the case of this catalyst being 6.3%.

Example 6 (control): commercial catalyst containing 1% by weight of palladium on an activated carbon support which has a nitrogen adsorption BET specific surface equal to 1320 m$^2$/g, the dispersion D of the palladium in the case of this catalyst being 10%.

Example 7 (control): this catalyst containing 1% by weight of palladium deposited in a surface layer of the granules of a granular activated carbon support of nitrogen adsorption BET specific surface equal to 1200 m$^2$/g, the dispersion D of the palladium in the case of this catalyst being 24%.

PREPARATION OF THE CATALYSTS OF EXAMPLES 1 TO 4

A dispersion of the chosen granular activated carbon support in 1.5N nitric acid was heated to reflux for 2 hours. After filtration, the solid was washed with water to neutrality and then dried at 100° C. and next calcined at 300° C. in air for 2 hours.

A controlled quantity of a solution of dinitrodiaminoplatinum was added gradually to a continuously stirred aqueous suspension of calcined activated carbon originating from the nitric acid treatment to obtain 1% by weight of platinum in the catalyst. At the end of this addition stirring was continued for 4 hours and the solid was then stored in the liquid phase with stirring for 8 hours. The catalyst was then filtered off, washed, dried under nitrogen and then calcined in air at 200° C., the calcined catalyst being cooled to ambient temperature and purged with nitrogen for 15 minutes.

The purged catalyst was then reduced with hydrogen at 500° C. for 2 hours, by employing 600 l of hydrogen per liter of catalyst per hour.

Preparation of the catalyst of Example 7: the granular activated carbon support was placed in a receptacle and immersed in distilled water. After addition of the controlled quantity of palladium chloride to the contents of the receptacle to obtain 1% by weight of palladium in the catalyst, the mixture was evaporated slowly, with stirring, on a sand bath until a dry powder was obtained. The catalyst was then dried in the oven at 120° C. for 12 hours.

The dried catalyst was next calcined in air at 200° C. for 2 hours and then reduced with hydrogen at 500° C. for 2 hours.

OPERATING CONDITIONS FOR CARRYING OUT THE DEOXYGENATION TESTS seawater flow rate 30 l/h seawater oxygen content 8 ppm temperature of the seawater along the entire deoxygenation circuit 15° C.

hydrogen flow rate (stoichiometry+20%) 430 ml/h pressure upstream of the reactor 2 bars To simulate the effect of a long period of use of the process on the activity of the catalyst, the deoxygenation tests were also carried out after the catalyst had been subjected to accelerated aging.

CATALYST AGING PROCEDURE

The catalyst was suspended in seawater with air sparging. After one week's aging in these conditions the catalyst was filtered off and dried.

The results obtained during the various tests are collated in the table below.

| Examples | Quantity of oxygen consumed by the reaction $2H_2 + O_2 \rightarrow 2H_2O$ (g per hour and g of catalyst) | |
|---|---|---|
| | Unaged catalyst | Aged catalyst |
| 1 | $4.4 \times 10^{-2}$ | $4.0 \times 10^{-2}$ |
| 2 | $5.1 \times 10^{-2}$ | $5.0 \times 10^{-2}$ |
| 3 | $5.7 \times 10^{-2}$ | $6.0 \times 10^{-2}$ |
| 4 | $6.2 \times 10^{-2}$ | $5.7 \times 10^{-2}$ |
| 5 (control) | $1.9 \times 10^{-2}$ | $2.1 \times 10^{-2}$ |
| 6 (control) | $1.8 \times 10^{-2}$ | $0.6 \times 10^{-2}$ |
| 7 (control) | $2.7 \times 10^{-2}$ | $1.2 \times 10^{-2}$ |

From the results in the table it is clear that the control catalysts based on palladium on activated carbon (Examples 5 and 6) have, from the outset, activities that are markedly lower than the catalysts employed according to the invention and that these activities are further reduced by a factor of approximately 2 in the case of the aged catalysts, which indicates that these catalysts containing palladium on activated carbon are not stable with time in the presence of seawater.

The control catalyst based on platinum on activated carbon (Example 5), in which the platinum dispersion D is lower than 10% (D=6.3%) is stable to aging, but its activity is substantially lower than that of the catalysts according to the invention.

The catalysts according to the invention (Examples 1 to 4), which contain platinum in a surface layer of the activated carbon particles and have a platinum dispersion D higher than 10% and more particularly between 12% and 55%, exhibit an activity which is high and stable after aging for the reduction of oxygen with hydrogen.

EXAMPLE 8

The operation was carried out in conditions which were similar to those of Example 1, using 1 kg of catalyst.

The results obtained during a period of 800 hours of continuous plant operation show a very high degree of deoxygenation, namely approximately 99.99%, which resulted in a stable production of deoxygenated water containing approximately 1 ppb of residual oxygen.

The degree of deoxygenation is given by the relationship:

$(C_e - C_s)/C_e \times 100$, where $C_e$ and $C_s$ are the oxygen concentrations in the untreated and treated seawater, respectively, determined with the aid of oxygen probes 9 and 22.

We claim:

1. A process for deoxygenation of water, wherein the water is seawater, which process comprises the steps of adding exogenous hydrogen to the water, allowing the added hydrogen to dissolve in the water, obtaining a catalyst which consists essentially of divided platinum in combination with particles of a granular activated carbon support, wherein the divided platinum of the catalyst is present in a surface layer of the activated carbon support particles and the dispersion of the platinum in the catalyst particles, defined as being the ratio of the number of platinum atoms at the surface of the particles to the total number of platinum atoms present in the said particles, is at least 14%, and wherein the catalyst is in a reduced state, and bringing the water which contains the dissolved hydrogen in contact with the catalyst.

2. The process of claim 1, wherein the granular activated carbon support has a specific surface, determined by application of the BET nitrogen adsorption method, of between 10 m²/g and 2,000 m²/g.

3. The process of claim 1, which is performed at a temperature between 0° C. and 60° C.

4. The process of claim 1 in which the hydrogen which is added to the seawater is a gaseous stream of hydrogen.

5. The process of claim 1, wherein the dispersion of the platinum in the catalyst particles is between 14% and 95%.

6. The process of claim 5, wherein the total quantity of platinum present in the catalyst is between 0.05% and 5% by weight of the catalyst.

7. The process of claim 1, wherein the quantity of added hydrogen which is dissolved in the seawater is at least equal to the stoichiometric quantity necessary for consuming the dissolved oxygen in the water to be deoxygenated.

8. The process of claim 7, wherein the seawater to be treated is subjected to filtration before the hydrogen is added.

9. The process of claim 7, wherein the water which contains the hydrogen is brought into contact with the catalyst at a flow rate between 2 liter and 100 liter per hour per liter of catalyst.

10. The process of claim 7, wherein the quantity of hydrogen which is dissolved in the seawater to be deoxygenated is between 1 and 2 times the stoichiometric quantity necessary for consuming all of the oxygen present in the seawater.

11. The process of claim 7, wherein the absolute pressure upstream of where the deoxygenation catalyst is brought into contact with the water which contains the hydrogen is maintained between 1 and 10 bars.

12. The process of claim 11, wherein the absolute pressure is maintained between 1.5 and 4 bars.

* * * * *